July 9, 1968

M. WOLFF 3,391,977

APPARATUS FOR SELECTIVELY PROJECTING ONE
OF A PLURALITY OF FILMS

Filed April 14, 1965

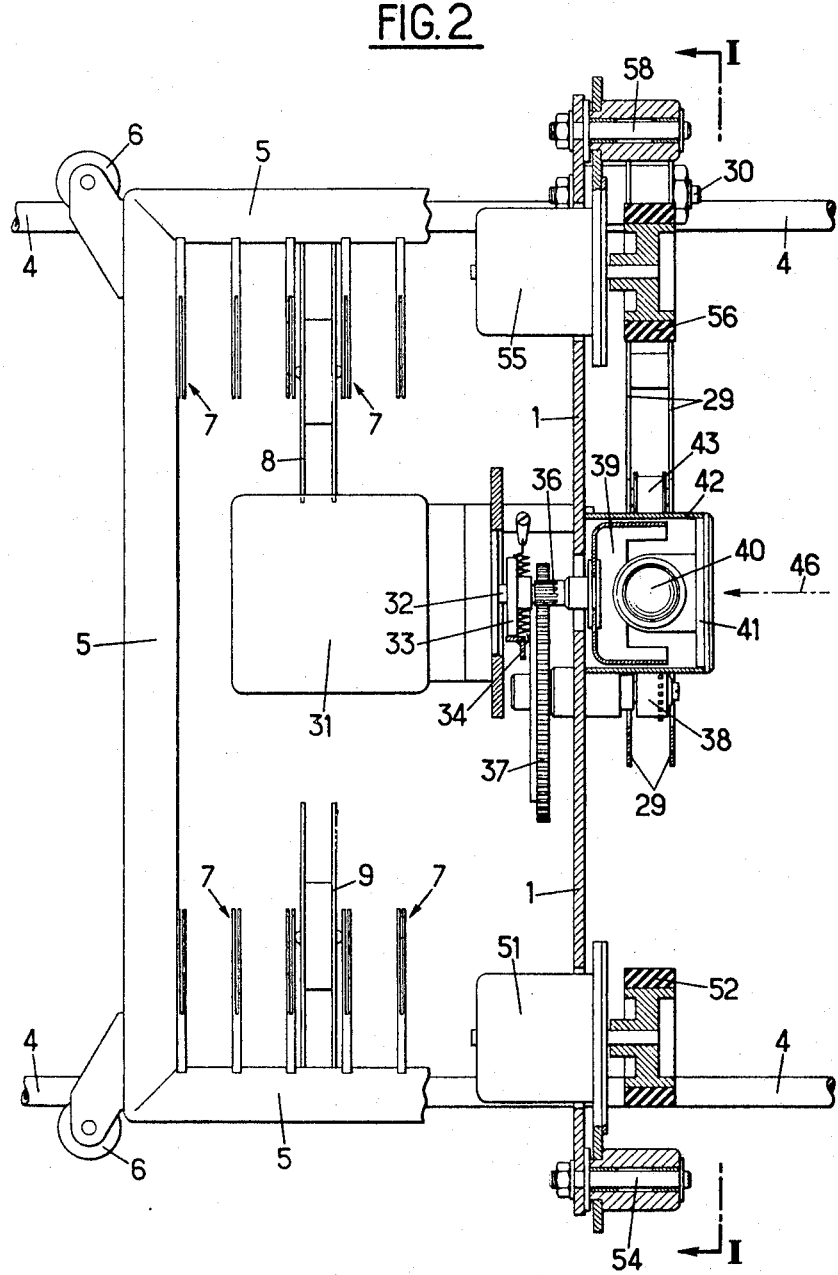

FIG.4
FIG.5
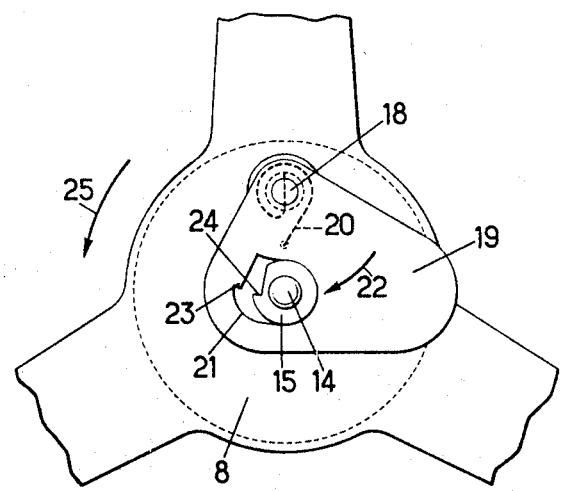
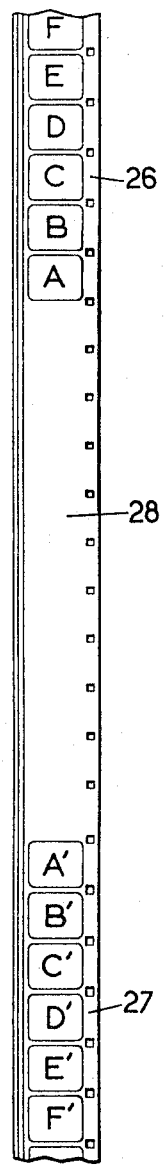
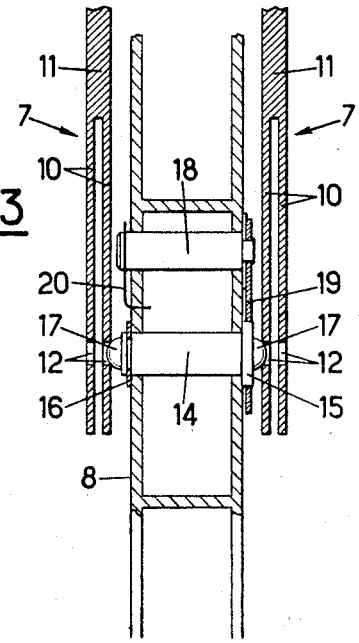

United States Patent Office 3,391,977
Patented July 9, 1968

3,391,977
APPARATUS FOR SELECTIVELY PROJECTING
ONE OF A PLURALITY OF FILMS
Marcel Wolff, 1 Rue Charles Delescluze, Paris, France
Filed Apr. 14, 1965, Ser. No. 448,155
8 Claims. (Cl. 352—123)

ABSTRACT OF THE DISCLOSURE

A motion picture projector comprising a magazine carrying a plurality of pairs of film reels, each pair of reels carrying two films positioned end to end on opposite sides of a central splice, the frames of one film being arranged in normal order and those of the other film in reverse order, and means for unwinding and rewinding said films.

---

Motion picture projecting apparatus has already been devised which is capable of automatically selecting one film from among a series of films stored in a magazine, bringing the selected film into projecting position, projecting it, rewinding it, and returning it to its place in the magazine. Such projectors are commonly used in conjunction with coin-operated release means which are located in public places and must frequently project sound and color films illustrating a piece of music.

These machines suffer from the disadvantage that their magazines will hold only a relatively small number of films, unless the machines are made quite cumbersome, heavy and expensive.

In effect, in all such apparatus, the magazine which is translated or rotated comprises two reels for each film, which serve alternately as the supply reel and the winding reel, together with means for driving and braking these reels for both projecting and rewinding, which further increases the bulk of the device.

The purpose of this invention is to provide a simplified apparatus which has a smaller number of reels and consequently a less cumbersome magazine.

The invention is embodied in a new article of manufacture which consists of a motion picture projector equipped with an automatic film selector, of the type comprising a stationary projector, a reel carrying magazine and a movable arm provided with rollers which automatically positions the selected film in the projector. This new machine is essentially characterized by the fact that each pair of reels in the magazine carries two films positioned end to end on opposite sides of a central splice, one of said films having its successive frames arranged in the normal order, while the frames of the other film run in the reverse order. The apparatus also comprises a control device by means of which the motor may be caused to turn in either direction depending on the film selected, together with two rewinding motors, one for driving each of the reels of the selected pair, and, photoelectric control means for stopping the rewinding when the central splice of the two films passes at the level of the projector.

The apparatus may also comprise the following features, taken singly or in combination:

(1) The magazine consists of a simple cage sliding on two horizontal rails parallel to its sides each of which carries a series of thin plates which are paired to form brackets between which the reels are rotatably mounted.

(2) Each of the reels of the magazine is provided with centrifugal control means biased by a spring. This device brakes the reel gently at low speeds but more strongly at the higher speeds used for rewinding.

(3) The projection cartridge projects a beam of light parallel to the rails onto an inclined mirror carried by the arms, which reflects the light through the film in a substantially horizontal direction perpendicular to the rails.

(4) A reversible electric motor directly drives a cylindrical shutter which encircles the objective of the projector. A cam controls the movements of the oscillating mirror positioned in front of the objective, and a reduction gear provided with wear take-up means drives a feeding sprocket.

In order that the object of the invention may be clearly understood one embodiment thereof will now be described, purely by use of illustration, in conjunction with the accompanying drawings, in which:

FIG. 2 is a section taken along the line II—II of FIG. 1;

FIG. 3 is a sectional view taken through the axis of a reel and showing the magazine on an enlarged scale.

FIG. 4 is an elevational view on an enlarged scale, showing the central part of a reel; and FIG. 5 shows the central part of a film.

Figure 1:
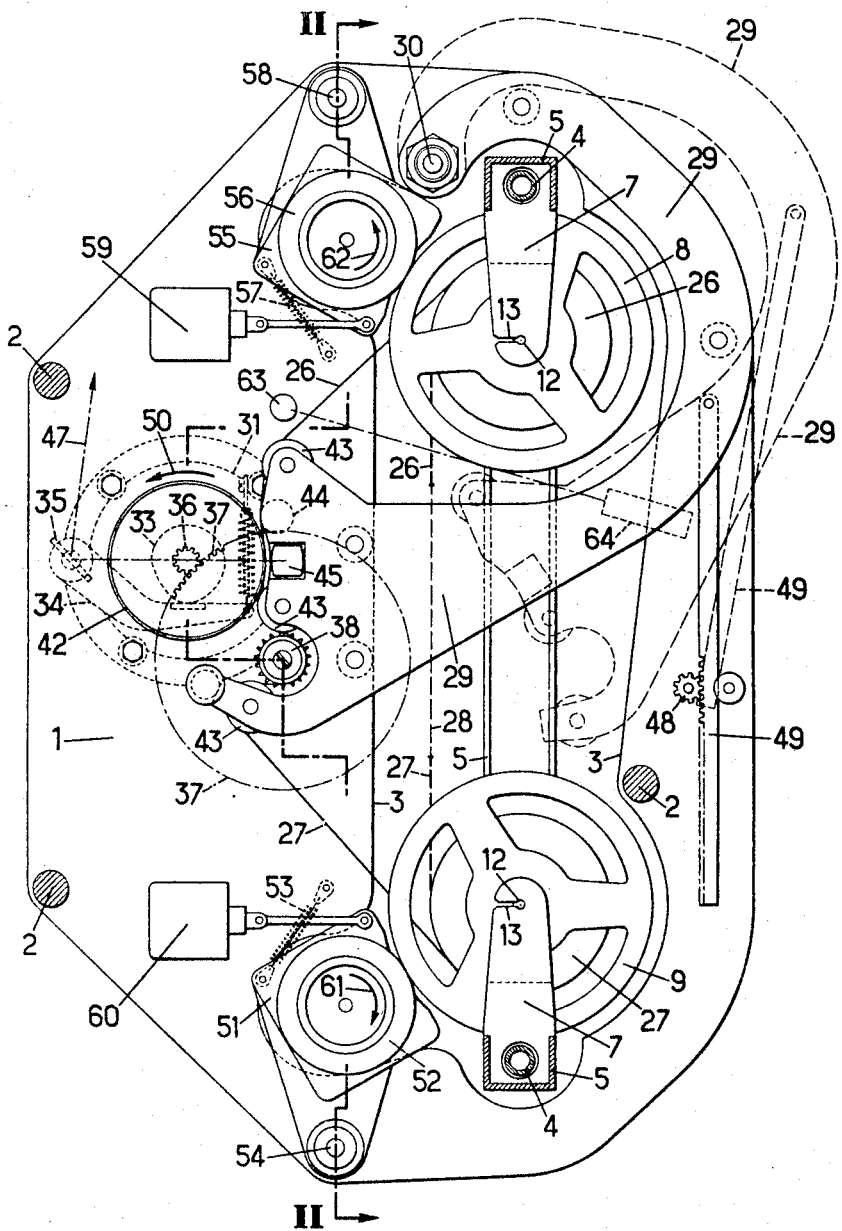
FIG. 1 is a horizontal section taken along the line I—I of FIG. 2.

As seen in FIGS. 1 and 2, the essential parts of the projection apparatus are grouped on a flat plate 1, about mid-way of the height of the device and fixed to a frame work (not shown) by three rods 2 (FIG. 1) which are perpendicular to the plate. This plate is provided with a large slot 3. Two other rods 4, likewise fixed to the framework, extend through this slot and do not touch the plate. These rods serve as rails to guide the carriage 5 which consists simply of 4 side members, carrying rollers 6 provided as the wear take-up means, or skids made of a self fabricating material, so as to be translationally slidable along the rods 4.

The two horizontal sides of this carriage each carry a series of inwardly projecting fins 7 which support the reels 8 and 9. Each of these fins comprises as shown in FIG. 3, two parallel plates 10 made of spring steel projecting from a solid base portion 11 attached to the carriage side. These parallel plates are provided near their ends with a circular orifice 12, each connected to an edge of the pate by a chamfered slot 13, as shown in FIG. 1.

The film reels 8 and 9, which are of a conventional type, and are preferably made of a plastic material, turn on a central shaft 14, provided on one side of the reel with a collar 15 and on the other with a stop-washer 16. The two ends of the shaft 14 are spherical, as shown at 17, or conical; and are centered by forcing them between the two plates 10 on opposite sides of the reel. These resilient plates 10 frictionally resist rotation of the shaft 14. Moreover, the reel carries a second shaft parallel to the shaft 14 fixed at one end to a heavy steel stamping 10 and at the other to one end of a draw spring 20, the other end of which is attached to the reel.

The stamping 19 is provided with an opening 21 having the shape shown in FIG. 4 and through which the collar 15 on the shaft 14 extends. The spring 20 constantly urges the shaft 18 in the direction indicated by the arrow 22, that is to say, so that the collar 15 is constantly subjected to a slight braking pressure because the stamping 19 presses against its periphery as shown in FIG. 4. This slight braking pressure is effective while the film is being slowly unwound during its projection, and also when it is stopped. On the other hand, when the reel is turning at high speed, during rewinding of the film on the opposite reel, the stamping 19, which has a center of gravity displaced from the shaft 14, overcomes the bias of the spring 20, and the notch 23 in the edge of the opening 21 engages the corresponding projection 24 on the collar 15 when the reel turns in the direction indicated by the arrow 25.

Once this engagement has taken place, the shaft 14 turns at the same speed as the reel and the latter is braked by the braking pressure exerted by the plate 10 on the shaft 14, which is greater than that of the stamping 19 on the collar 15.

A film 26 of a conventional type is wound on the reel 8 and provided with a series of perforations and a sound track. The film is prepared in the conventional manner, that is to say, with a succession of frames positioned to be presented chronologically as the film is moving from top to bottom.

Another film 27 is wound on the reel 9 and likewise provided with perforations and a sound track, but the frames on this film are arranged on the reverse order so as to be chronologically presented when the film is travelling from bottom to top. (See FIG. 5.)

The end of the film 26 corresponding to its beginning, and the end of the film 27 corresponding to its beginning may thus be connected together by means of a central splice 28. When at rest, all the central splices 28 of all the pairs of films are positioned between the two series of reels 8 and 9, the films 26 and 27 connected by splices 28, being normally stretched between the corresponding pairs of reels as shown in broken lines on FIG. 1.

The carriage 5, carrying the two series of reels 8 and 9 carrying the stretched films, is slidable along the rods 4 which pass through the slot 3 in the plate 1. Actuating means (not shown) are provided for moving the carriage 5 in both directions along the rods and for holding the carriage stationary whenever a selected one of the films 26 and 27 reaches the proper height for projection.

At this moment an arm 29, pivoted on a shaft 30 perpendicular to the plate 1 rotates so as to contact the central splice 28 of the films 26–27 and bring it into position on the projecting apparatus as shown in solid lines on FIG. 1.

This projecting apparatus consists essentially of a reversible constant speed electric motor 31, the drive shaft 32 of which carries in succession a cam 33, which actuates through lever 34 an oscillating mirror 35, and a pinion 36 which engages a large gear 37, preferably provided with wear take-up means, and which drives by means of a shaft passing through the plate, a feeding sprocket 38 provided with peripheral projections for engaging the film.

Finally, the shaft 32 ends in a cylindrical shutter 39 which encircles the objective 40, fixed to the cover 41 of a protective box 42 encircling the shield and provided with suitable orifices.

The arm 29 carries three guide rollers 43, as well as a magnetic sound pick-up head 44 and an inclined mirror 45, which receives a light beam emitted perpendicularly to the plate 1 by a projection cartridge provided with a reflector, and reflects it through the shutter 39 and the objective 40, on to the oscillating mirror 35. This mirror compensates for the movement of the film during the projection of each frame and finally reflects a projecting beam 47 which is received at the top of the apparatus by a set of mirrors and projected on a screen.

It will be readily understood that once the arm 29, which when at rest occupies the position shown in broken lines on FIG. 1, has swung into the position shown in solid lines, thus locating the central splice 28 in position on the projecting device starting of the motor 31 in one direction will cause projection of the film 26 and in the opposite direction will cause projection of the film 27. The direction of rotation of the motor is controlled by the device which selects the particular pair of films.

Control means operated by electric buttons (not shown) stops the carriage 5 when the selected film reaches the level of the objective, and at the same time starts a reversible motor which swings the arm 29 by means of a pinion 48 and rack 49. At the end of its path of travel either the rack or the arm closes an electrical contact which causes the projection cartridge to light up, energizes the sound pick-up head, and causes the motor 31 to rotate in the direction determined by the film selection which has been made.

If it be supposed for example, that the film 26 wound on the reel 9 is to be projected, the motor 31 must turn in the direction indicated by the arrow 50. The film 26 is then projected normally and rolls up on top of the film 27 on the reel 9. In order to ensure that the film 26 rolls up on the reel 9 at the same rate that it is fed by the sprocket 38, a motor 51 drives a rubber roller 52 which rolls on the edge of the reel 9, against which it is biassed by a spring 53. The motor and roller are pivotally mounted on a shaft 54. The motor 51 is so supplied as to provide a low driving torque and allows substantial stoppage in driving the reel 9.

In order that the projector may operate in both directions, an identical motor 58 is provided in the upper part of the apparatus and this motor drives a rubber roller 56 which frictionally engages the edge of the reel 8, against which it is biassed by a spring 57. This motor and roller are pivotally mounted on a shaft 58. When the film 26 is being projected the roller 56 is held out of contact with the reel 8 by a solenoid 59, while a solenoid 60 is also provided to prevent contact between the roller 52 and the reel 9.

When all of the film 26 has passed through the projector, a sound responsive relay responsive to the stopping of the sound emitted by the magnetic head 44, stops the motor 31, turns off the projection cartridge, cuts off the sound amplifier, returns the arm 29 to its previous position, de-energizes the solenoid 59 and so excites the electromagnet 60 so that the roller 56 now comes into contact with the edge of the reel 8, whereas the roller 52 moves away from the reel 9.

The motor 55 is then so supplied that it turns at a constant speed higher than its projecting speed, so that the film 26 is rapidly rewound on the reel 8.

During this rapid rewinding on the reel 8, the reel 9 is more strongly braked through the centrifugal pawl 19, hereinbefore described, so that the film is kept stretched despite any small variations in the speed and inertia of the reel.

It should be noted that the motors 51 and 55, when they are in operation, are always used for rewinding, in the direction indicated by the arrows 61 and 62, regardless of whether they are exerting relatively little torque at low speeds, with much slippage, or exerting a greater torque for the first rewinding. They consequently turn only in one direction, although they are capable of operating in two different ways.

The film 26 is then rewound on the reel 8 until the contact splice reaches the space between the reels 8 and 9. At this time it is necessary to stop the rewinding in order to prevent winding of the film 27 over the film 26. For this reason the splice 28, passes between a photo-electric cell 63 mounted on the plate 1 and a light source 64 carried by the arm 29. The central splice 28 may be simply transparent so as to permit the cell 63 to be excited, thus stopping the rewinding. The mechanism is then ready to select another film.

It is also possible to provide a series of alternately transparent and opaque bands on the splice so as to pass to the photocell a beam modulated at a predetermined frequency. Moreover, by placing transparent or banded lead-in sections at the ends of the films 26 and 27, where they are attached to their respective reels, the same cell 63 may be used to start the rewinding instead of the sound responsive relays hereinbefore described. If necessary, a separate light source may be provided for the purpose.

The assembly which has been described is relatively light and is preferably removably mounted in the lower part of an article of furniture, the upper part of which carries the set of mirrors, the projection screen, the loudspeakers, and the selecting key-board, so that the assembly may be easily repaired or replaced as a unit.

The program may be changed by simultaneously removing the two reels constituting any pair by simply lifting them up and replacing them with another pair of reels which snap on when simply pressed into place.

Moreover, since there are two films for each pair of reels the bulk of the apparatus is reduced by at least half as compared with a conventional device having the same number of films. When compared with a device of the same size, my apparatus can accommodate twice as many films, which constitutes a substantial advantage.

The same apparatus may naturally serve several purposes. In addition to use as a component of a coin-operated device, it may be used for educational purposes, or as a publicity device, in which cases the films may carry, for example, answers to questions carried on the keyboard.

It will of course be appreciated that this embodiment has been described purely by way of example and may be modified as to detail without thereby departing from the basic principles of this invention.

What is claimed is:

1. Film feeding apparatus for a motion picture projector adapted for use in projecting a selected one of a plurality of elongated films, each film comprising sequences of picture frames along different length portions thereof, said portions including a first length portion the frames of which are positioned on the film for projection in proper chronological order when the film is travelling in one direction, and a second length portion, the frames of which are positioned to be projected in proper chronological order when the film is travelling in the opposite direction, said apparatus comprising a magazine provided with two reels for each film, one for carrying each length portion of said film, reversible means for driving said film in either direction, a separate rewinding motor for individually driving each reel, and means for automatically preventing further rotation of a reel by a rewinding motor whenever one portion of said film has been completely wound thereon.

2. Apparatus as claimed in claim 1 comprising a plurality of parallel rails, said magazine being slidable as a unit on said rails.

3. Apparatus as claimed in claim 2 comprising means for projecting a light beam parallel to said rails, and a mirror which reflects said beam through said film in a horizontal direction substantially perpendicular to said rails.

4. Apparatus as claimed in claim 1 comprising brake means for each of said reels, said brake mens being resiliently biassed toward a braking position, and centrifugally operated means for increasing the braking pressure exerted by said braking means as the speed of rotation of that reel increases.

5. Apparatus as claimed in claim 1 in which said film driving means comprises a reversible electric motor, a film driving sprocket, and reduction gearing equipped with wear takeup means, and through which said motor drives said sprocket, said apparatus comprising also a cylindrical shutter driven by said motor, an objective encircled by said shutter, means for projecting a light beam to said objective, an oscillating mirror in the path of said light beam, and cam means through which said oscillating mirror is driven by said motor.

6. An elongated motion picture film comprising sequences of picture frames along different length portions thereof, the frames of one of said length portions being positioned on the film for projection in proper chronological order when the film is travelling in one direction and the frames of the other of said length portions being positioned to be projected in proper chronological order when said film is travelling in the opposite direction.

7. A motion picture film as claimed in claim 6 in which said portions have adjacent ends connected by a transverse strip carrying indicia adapted to modulate a light beam projected therethrough, which modulated beam may be used to actuate film control means.

8. A motion picture film as claimed in claim 7, in which the frames of said one and said other length portions are positioned for projecting in proper chronological order when the film is travelling in opposite directions from said indicia-carrying strip.

References Cited

UNITED STATES PATENTS

| | | | |
|---|---|---|---|
| 1,073,411 | 9/1913 | Dressler et al. | 352—240 |
| 2,624,231 | 1/1953 | Kingston | 352—83.0 X |

FOREIGN PATENTS

| | | |
|---|---|---|
| 665,136 | 9/1938 | Germany. |
| 973,199 | 9/1950 | France. |

JULIA E. COINER, *Primary Examiner.*